United States Patent [19]

Musa

[11] Patent Number: 4,827,420
[45] Date of Patent: May 2, 1989

[54] NAVIGATION APPARATUS FOR VEHICLE

[75] Inventor: Ikuo Musa, Himeji, Japan

[73] Assignee: Mitsubishi Denki Kabushiki Kaisha, Tokyo, Japan

[21] Appl. No.: 60,451

[22] Filed: Jun. 11, 1987

[30] Foreign Application Priority Data

| Jun. 12, 1986 | [JP] | Japan | 61-139015 |
| Jun. 12, 1986 | [JP] | Japan | 61-139016 |
| Jun. 12, 1986 | [JP] | Japan | 61-139017 |
| Jun. 12, 1986 | [JP] | Japan | 61-139019 |

[51] Int. Cl.$^4$ ............................................. G06F 15/50
[52] U.S. Cl. .................................... 364/449; 340/988; 340/99 S; 73/178 R
[58] Field of Search ................. 364/443, 444, 449; 73/178 R; 340/988, 990, 995

[56] References Cited

U.S. PATENT DOCUMENTS

| 4,511,973 | 4/1985 | Miura et al. | 340/990 |
| 4,646,089 | 2/1987 | Takanabe et al. | 340/988 |
| 4,677,450 | 6/1987 | Ito et al. | 364/449 |
| 4,677,561 | 6/1987 | Akama et al. | 340/995 |
| 4,677,562 | 6/1987 | Uota et al. | 364/449 |
| 4,677,563 | 6/1987 | Itoh et al. | 364/449 |
| 4,688,176 | 8/1987 | Hirata | 364/449 |
| 4,763,303 | 4/1988 | Itoh et al. | 364/449 |

FOREIGN PATENT DOCUMENTS

| 2341162 | 2/1975 | Fed. Rep. of Germany . |
| 3418081 | 11/1985 | Fed. Rep. of Germany . |
| 3609287 | 10/1986 | Fed. Rep. of Germany . |
| 58-178214 | 10/1983 | Japan . |
| 59-204081 | 11/1984 | Japan . |

OTHER PUBLICATIONS

M. Jarvis et al., "Cathode-Ray Tube Information Center with Automotive Navigation", *SAE Technical Paper Series*, (840313), pp. 123–137, 1984.

P. Haeussermann, "On-Board Computer System for Navigation, Orientation and Route Optimization", *SAE Technical Paper Series*, (840485), pp. 1–9, 1984.

*Primary Examiner*—Gary Chin
*Attorney, Agent, or Firm*—Burns, Doane, Swecker & Mathis

[57] ABSTRACT

A navigation apparatus for a vehicle comprising means for previously introducing and storing the coordinate data and place names of a plurality of spots and means for computing the present location of the vehicle, so that the position and place name of a spot close to the present location of the vehicle are displayed, and the present location of the vehicle may be set by introducing the place name when the vehicle is positioned at any one of the close spots, and a spot, such as a garage, where the vehicle usually parks for along time is pre-registered, so that, when the vehicle is positioned at the registered spot, a switch is operated, and, when the vehicle stops at the spot for a predetermined duration or more or over a duration including a predetermined interval, the locational data of the registered spot is taken as the present location of the vehicle, thereby correcting accumulated errors at the present location of the vehicle.

4 Claims, 17 Drawing Sheets

Fig. 8(a)

```
REGISTRATION OF PLACE NAME

PLACE NAME=?
```

Fig. 8(b)

```
REGISTRATION OF PLACE NAME

PLACE NAME =HIMEJI-KITAMON
LATITUDE=N?
```

Fig. 8(c)

```
REGISTRATION OF PLACE NAME

PLACE NAME =HIMEJI-KITAMON
LATITUDE=N35.00
LONGITUDE=E135.00

PUSH  INPUT  KEY
```

Fig. 10(a)

```
SETTING OF PRESENT LOCATION

PLACE NAME=?
```

Fig. 10(b)

```
SETTING OF PRESENT LOCATION

PLACE NAME=HIMEJI-KITAMON
 N 35.00
 E 135.00
PUSH [INPUT] KEY
```

```
CORRECTION IS OVER

PRESENT LOCATION
IS HIMEJI GARAGE
```

Fig. 16(a)

```
IS HERE GARAGE?

IF SO, PUSH CORRECTION KEY.
```

Fig. 16(b)

```
IS HERE
    Mr. YAMAMOTO'S HOUSE?

IF YOU PUSH CORRECTION KEY,
PRESENT LOCATION IS
CORRECTED BY LOCATION OF
YAMAMOTO'S HOUSE.
```

NAVIGATION APPARATUS FOR VEHICLE

BACKGROUND OF THE INVENTION

1. Field of the Invention

The present invention relates to a navigation apparatus mounted such as might be on a vehicle, such as an automobile or the like, so as to obtain and display information as to a traveling route and the location of the vehicle, and more particularly to a navigation apparatus for a vehicle, which facilitates correction of errors caused and accumulated by the vehicle location setting either initially or as the vehicle travels.

2. Description of the Prior Art

A conventional navigation apparatus for a vehicle is generally disclosed in Japanese Patent Laid-Open No. 59-204081 (1984) or Japanese Patent Laid-Open No. 58-178214 (1983). The system of latter is provided with a distance detector for detecting a traveling distance of a vehicle, an azimuth, detector for detecting a present traveling direction of the same, and an indicator for indicating the present location of the same, so that the present location of the vehicle is recognized by spherical coordinates or rectangular coordinates and computed as the vehicle travels, thereby being update-displayed.

Besides this, a technique utilizing an artificial satellite (for example, "Cathode-Ray Tube Information Center with Automotive Navigation", SAE Technical Paper Series 840313 by Ford Motor Co.), a system for utilizing a guide system via an arterial road mainly for distance information, and an indication system for a destination in an urban area for obtaining the distance and azimuth information (for example, "On-Board Computer System for Navigation, Orientation and Route Optimization" SAE Technical Paper Series 840485 by Daimler-Benz AG) are well-known.

It is difficult for the aforesaid conventional navigation apparatus for a vehicle to completely eliminate measurement errors in the traveling distance detector and the azimuth detector and computation error in computing the present location. These errors are accumulated with travelling of the vehicle so that an error between the actual location and the indicated position of the vehicle tends to increase. Hence, this kind of navigation apparatus for the vehicle requires relatively frequent error corrections, but the conventional apparatus requires much labor to reset the present location at every correction by means of inputting coordinates of longitude and latitude or inputting coordinates showing relative location with respect to a certain reference point. Therefore, it takes much labor and time to correct the present location, which is very troublesome for a user.

SUMMARY OF THE INVENTION

In the light of the above circumstances, the present invention has been designed.

A first object of this invention is to provide a navigation apparatus for a vehicle in which it is easy to correct the present location thereof.

A second object of this invention is to provide a navigation apparatus for a vehicle, in which, when the vehicle is positioned at any one of plurality of spots wherein data as to the position has been previously introduced, the present location can be corrected merely by imputting the place name.

A third object of this invention is to provide a navigation apparatus for a vehicle, in which, when the vehicle is positioned at a spot (such as a garage or the like) where the positional data as to the spot is previously registered for correcting the present location, the accumulated present location errors can be corrected merely by once pushing a correction switch.

A fourth object of this invention is to provide a navigation apparatus for a vehicle, which detects that the vehicle stops for more than a predetermined time at the spot (such as a garage or the like) where the positional data as to the spot is previously registered for correcting the present location, thereby automatically correcting the accumulated present location errors.

A fifth object of this invention is to provide a navigation apparatus for a vehicle which detects that the vehicle stops for more than a predetermined time at the spot (such as a garage or the like) where the positional data as to the spot is previously registered for correcting the present locations, and interrogates a user as to whether or not the accumulated present position errors are to be corrected.

A sixth object of this invention is to provide a navigation apparatus for a vehicle which detects that the vehicle stops for a time period from a first predetermined time to a second predetermined time at the spot (such as a garage or the like) where the positional data as to the spot is previously registered for correcting the present location, thereby automatically correcting the accumulated present location errors.

A seventh object of this invention is to provide a navigation apparatus for a vehicle, which detects that the vehicle stops for a time period from a first predetermined time to a second predetermined time at the spot (such as a garage or the like) where the positional data as to the spot is previously registered for correcting the present location, and interrogates the user as to whether or not the accumulated present location errors are to be corrected.

A navigation apparatus for a vehicle of this invention is provided with a travelling distance detection means, an azimuth detection means for detecting the traveling direction of said vehicle, a map memory for storing therein the map information relating to a traveling route of said vehicle, a display unit and display control means therefor which reads out the map information from said map memory and graphically displays said map information on said display unit, and a present location computation means which computes the present location information of said vehicle on a basis of the detection results of said traveling distance detection means and the azimuth detection means and displays said present location information on an image of said display unit. It additionally has an input means for introducing therein the place name and coordinates of longitude and latitude of an arbitrary spot as the spot information thereof; a spot memory for storing therein said spot information; and a spot information display means which searches said spot memory for a spot closest to the present invention computed by said present invention computation means and displays said read out information.

The above and further objects and features of the invention will more fully be apparent from the following detailed description with accompanying drawings.

BRIEF DESCRIPTION OF THE DRAWINGS

FIGS. 8(a), 8(b) and 8(c) are schematic views of the contents of screen following the FIG. 7 flowchart, FIGS. 10(a) and 10(b) are schematic representations of the screen following the FIG. 9 flowchart, FIGS. 16(a) and 16(b) are schematic views exemplary of the screen during the accumulated error correction.

DESCRIPTION OF THE PREFERRED EMBODIMENTS

Figure 1:
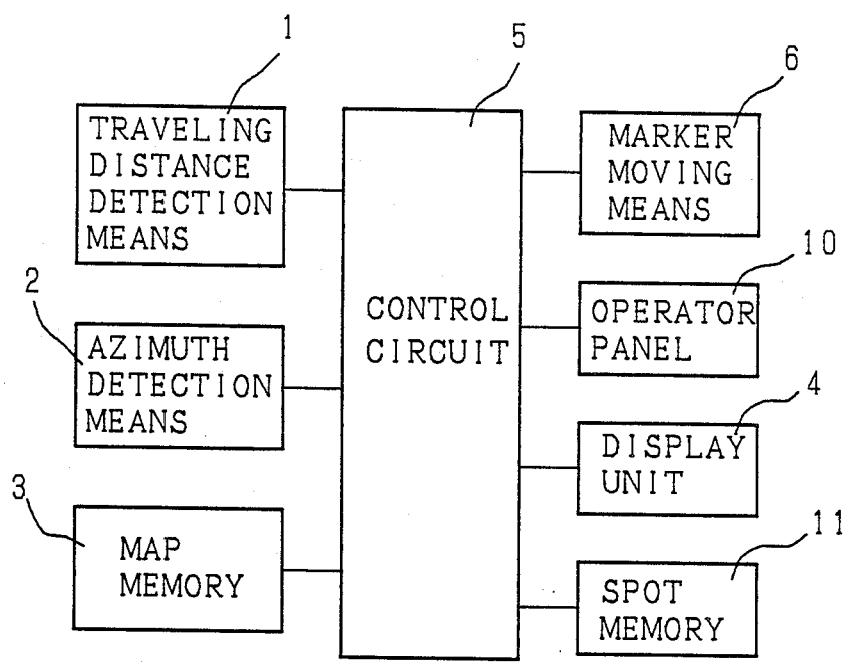
FIG. 1 is a block diagram of an embodiment of a navigation apparatus of the invention.

Referring to FIG. 1, reference numeral 1 designates a traveling distance detection means for generating a signal of frequency proportional to the traveling speed of a vehicle (not shown), 2 designates an azimuth detection means for detecting the traveling direction of the vehicle, and 3 designates a map memory storing therein the map information, such as roads depicted on a map.

The traveling distance detection means 1, azimuth detection means 2 and map memory 3 connect to a control circuit 5, with which a spot memory 11, marker moving means 6, a operator panel 10 of input means for a place name and coordinates of longitude and latitude of an arbitrary spot, and a display unit 4 for displaying a traveling route and locus are connected.

The spot memory 11 serves to store the specified spot information, the display unit 4 displaying the map information and spot information given from the map memory 3 and spot memory 11 so that the traveling locus of the vehicle is displayed on the display image.

The control circuit 5 reads out the data from the map memory 3 and spot memory 11 and serves as display control means for displaying on the display unit 4 the map information and spot information, as present location computation means for computing the traveling locus of the vehicle to display it on the display unit 4, and as correction means for deciding necessity of the present position correction to be executed.

The marker moving means 6 serves to move a marker toward a proper location displayed on the map. The marker indicates the present location of the vehicle as displayed on the display unit 4 (hereinafter referred to as the present location marker), thereby correcting the present location of the vehicle.

The azimuth detection means 2 includes a system for determining the direction of the terrestrial magnetism or a system utilizing a gyroscope. For the sake of definiteness, the system according to this invention is described below assuming incorporation of a magnetic-type detector. Details of incorporation of another type of detector such as an inertial detector are, however, similar and will be apparent to one having ordinary skill in the art.

Figure 2:
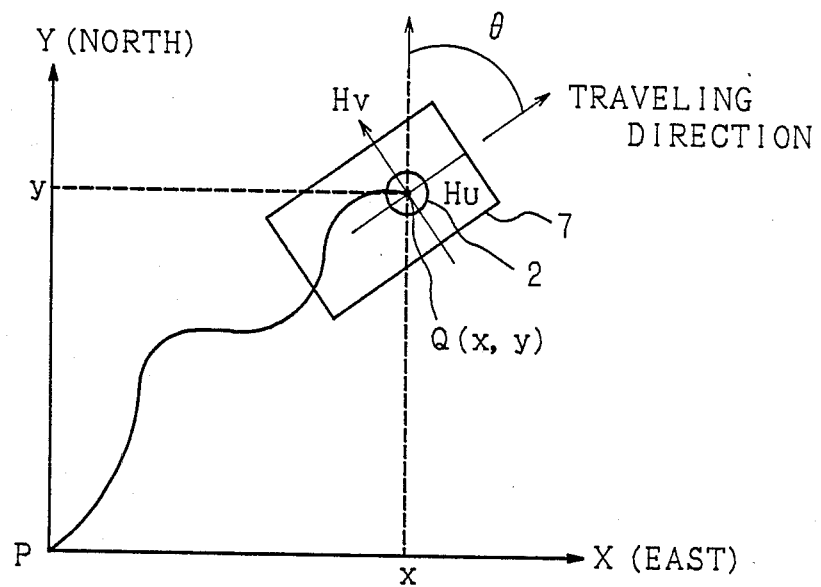
FIGS. 2, 3(a) and 3(b) are schematic representations explanatory of an azimuth detecting method.

The azimuth detection means 2 uses a magnetic sensor having two rectangular detection axes, one of which, as shown in FIG. 2, is identical with the traveling direction of a vehicle 7, the other being placed in the horizontal plane perpendicular to the traveling direction of the vehicle 7, thereby setting the azimuth detection means 2 at an arbitary location on the vehicle 7.

In a case where the vehicle 7 is positioned at an angle $\theta$ formed by the traveling direction of the vehicle 7 with magnetic north, when the horizontal component of the terrestrial magnetism is represented by H, the magnetic field components $H_U$ and $H_V$ in the direction of two detection axes at the azimuth detection means 2 are given in $H_U = K_1 H \cos\theta$ and $H_V = K_2 H \sin\theta$, where $K_1$ and $K_2$ are the constants decided by construction of vehile and about equal to each other. In the following description, $K_1 = K_2 = K'$ is assumed for simplification, by which generality is not eliminated.

When the aforesaid magnetic field is applied to the azimuth detection means 2, two electrical output signals $E_U$ and $E_V$ obtained therefrom are given in $E_U = AH_U = AK'H \cos\theta$ and $E_V = AK'H \sin\theta$, where A is the constant relates to sensitivity of the azimuth detection means 2. In the above expressions, when AK' is substituted when K, $E_U = KH \cos\theta$ are obtained.

As shown in FIG. 2, the Y axis is arbitrarily directed to the north and the X axis to the east.

In such condition shown in FIG. 2, when the vehicle 7 moves by a minute distance d in the traveling direction thereof, the amounts of movement in the directions X and Y are represented by $\Delta x$ and $\Delta y$ respectively, $\Delta x$ and $\Delta y$ being given in the following expressions:

$$\left. \begin{array}{l} \Delta y = d \cdot \cos\theta \\ \Delta x = d \cdot \sin\theta \end{array} \right\} \quad (1)$$

Besides $E_U = KH \cos\theta$ and $E_V = KH \sin\theta$ are changed as $\cos\theta = E_U/KH$ and $\sin\theta = E_V/KH$, and from $E_U^2 + E_V^2 = K^2 H^2$, $\cos\theta = E_U/\sqrt{E_U^2 + E_V^2}$, $\sin\theta = E_V/\sqrt{E_U^2 + E_V^2}$ are obtained. Hence, from the expressions (1), the expressions $$\left. \begin{array}{l} \Delta y = d \cdot E_U / \sqrt{E_U^2 + E_V^2} \\ \Delta x = d \cdot E_V / \sqrt{E_U^2 + E_V^2} \end{array} \right\} \quad (2)$$

are obtained.

Figure 3A:
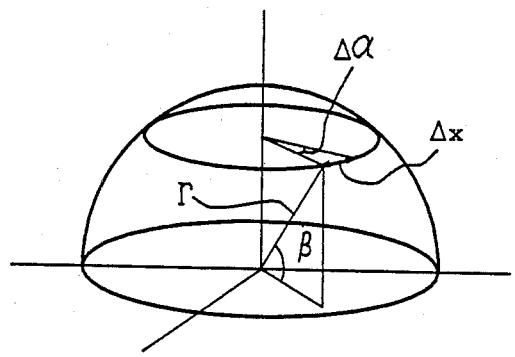
Figure 3B:
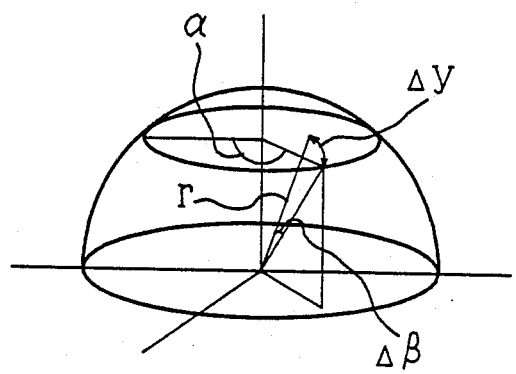

When the latitude of the present location is represented by $\beta$ and the longitude of the same by $\alpha$ and a radius of the earth by $\gamma$ as shown in FIGS. 3-(a) and -(b), $\Delta x$ and $\Delta y$ are transformed to variations $\Delta\beta$ and $\Delta\alpha$ of the latitude and longitude by the following expressions:

$$\Delta\alpha = \frac{\Delta x}{\gamma \sin(90° - \beta)} \cdot \frac{180°}{\pi} \quad (3)$$

$$\Delta\beta = \frac{\Delta y}{\gamma} \cdot \frac{180°}{\pi} \quad (4)$$

Thus, the present location of the vehicle 7 is computed and updated by the expressions (3) and (4) and on the basis of the latitude and longitude.

Accordingly, the latitude and longitude ($\beta$ and $\alpha$) of the present location Q of the vehicle, after the vehicle has traveled with an arbitrary spot P being the starting point, are obtained by putting $\alpha = \alpha p$ and $\beta = \beta P$ at the spot P and then adding $\Delta\alpha$ and $\Delta\beta$ to $\alpha$ and $\beta$ respectively each time the vehicle 7 travels by a minute distance d, and the points given by $\alpha$ and $\beta$ between the points P and Q are connected to obtain the traveling locus of vehicle 7.

The traveling distance detection means 1 as above-mentioned generates a signal having the frequency proportional to the travel speed of the vehicle 7, and, when this signal is formed into a pulse, pulses will be generated one by one each time the vehicle travels by a predetermined distance C.

Hence, the control circuit 5 adds $\Delta\alpha$ and $\Delta\beta$ to the aforesaid $\alpha$ and $\beta$ each time one pulse is generated from the traveling distance detection means 1 to thereby enable the traveling locus and present location to be computed.

Figure 4:
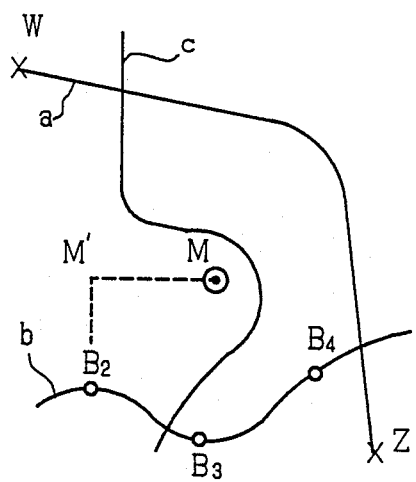
FIG. 4 is a schematic view explanatory of operation of a marker moving apparatus.

Next, explanation will be given on the marker moving means 6. Referring to FIG. 4, a marker ⊙ designated by M is explanatory of the present location marker, the point positioned at the center of the circle representing the present location of the vehicle 7. In the initial state, the control circuit 5 reads out the map data from the map memory 3, and the data is imaged to display a map on the display unit 4, at which time the present location marker M appears substantially at the center of the picture plane.

Prior to a travel of the vehicle 7, it is required to correct the present location thereof by moving the present location marker M to the present location of the vehicle 7 on the displayed map. For this purpose, the marker moving means 6 is used.

Figure 5:
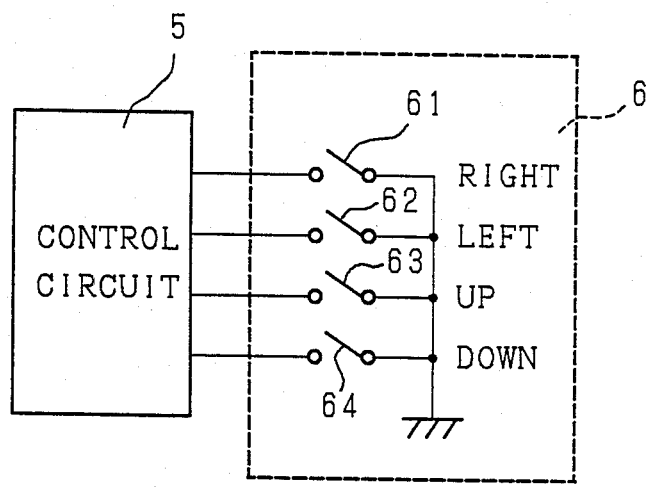
FIGS. 5 and 6 are circuit diagrams showing respectively the structures of the marker moving apparatus and an operator panel in FIG. 1.

FIG. 5 is a concrete circuit diagram showing an embodiment of the marker moving means 6, in which switches 61, 62, 63 and 64 are used to move the present location marker M rightwardly, leftwardly, upwardly and downwardly on the screen of the display unit 4.

For example, when the point $B_2$ ($\alpha_{B2}, \beta_{B2}$) on a road b is the starting point as shown in FIG. 4, the switch 62 is on to move the present location marker M leftwardly toward M', and then the switch 64 is on to downwardly move the present location marker M and match it with the point $B_2$, thereby enabling the coordinates of longitude and latitude ($\alpha, \beta$) of the present location p to be set as $\alpha = \alpha_{B2}, \beta = \beta_{B2}$.

In a case where the user intends to introduce into the apparatus arbitrary spot information, he operates the operator panel 10 to introduce the place name ("one's house", "garage", "Yamamoto's house" or "company") of the spot and the coordinates of longitude and latitude thereof, and then stores them in the spot memory 11.

The operator panel 10 can be a keyboard, a touch panel or the like, and the spot memory 11 can be a PROM, a RAM, a magnetic tape, a magnetic disc or the like.

The previously stored spot information, when the vehicle 7 passes through the vicinity of the spot, displays the point and name thereof on the screen thereby giving a driving guide to the user. Besides, when the present location is reset, only the place name of spot is set to enable the present location coordinates to be set to coordinates of the spot.

When the spot is set as the destination, the coordinates thereof can be set not in numeral representation but in the name of the spot.

Figure 6:
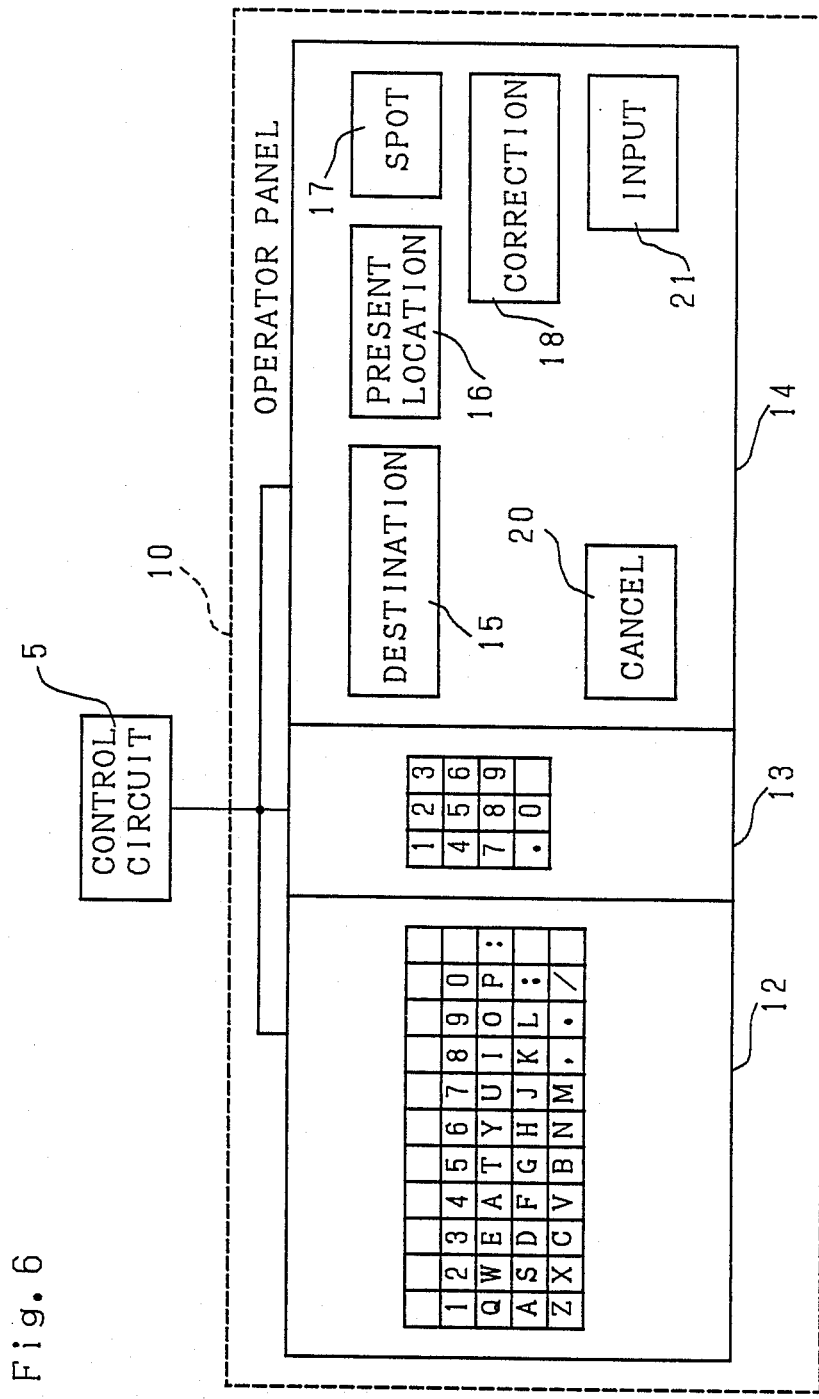

Next, explanation will be given on operation for introducing the spot information by the operator panel 10 in accordance with FIG. 6, the operator panel 10 now comprising a keyboard 12, a ten-key 13 and a function key 14.

The function key 14 comprises a destination key 15, a present location key 16, a spot key 17, a correction key 18, a cancel key 20 and an input key 21.

Explanation will be given on the procedure by which the user registers the spot information in the spot memory 11. At first, the user pushes the spot key 17 to enable the spot registration.

Figure 7:
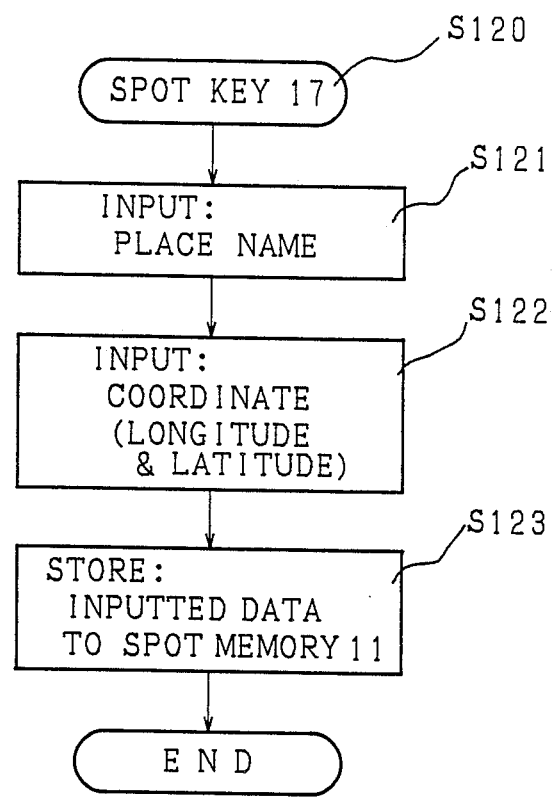
FIG. 7 is a flowchart showing a registration procedure for the spot information.

The flowchart of the spot registration process is shown in FIG. 7 and the screen therefor in FIG. 8. When the user pushes the spot key 7 at the step S120, the screen is displayed as shown in FIG. 8-(a), and a place name is inquired, at which time the key board 12 is used to introduce the place name at the step S121.

After the place name is introduced, the input key 21 is pushed and the screen displayed shown in FIG. 8-(b), then the coordinations of the place name are inquired. The coordinate input is carried out by use of the ten-key 13, and behind digits to be introduced the input key 21 is pushed to introduce the latitude and longitude in order. Such process is given in the step S122 in FIG. 7.

After the longitude is introduced, the screen is displayed as shown in FIG. 8-(c), at which time the input key 21 is pushed, thereby storing a set of spot information into the spot memory 11 (step S123).

The above-mentioned procedure can register the spot information as to many spots in an allowable range of capacity of the spot memory 11.

Next, explanation will be given on a step of resetting by the user the present location through the previously registered spot information. At first, the user pushes the present location key 16 to enable setting of the present location.

Figure 9:
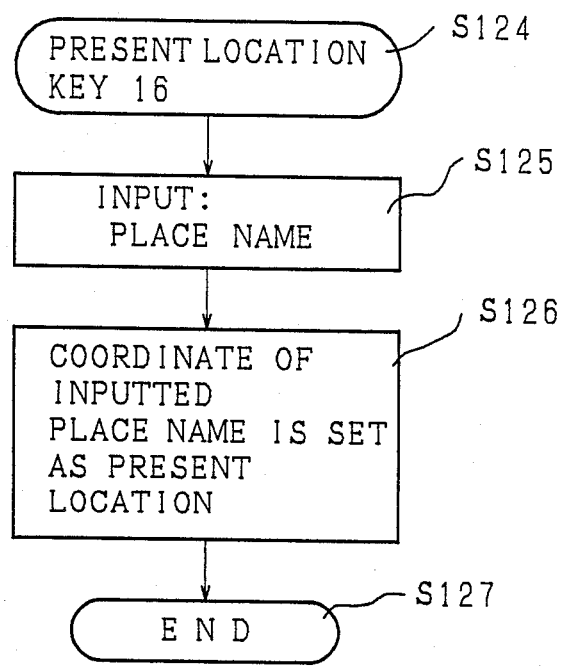
FIG. 9 is a flowchart showing a resetting procedure of the present position.

The flowchart of the present location setting process is shown in FIG. 9, at which time the screen of the display unit 4 is shown in FIG. 10. At first, when the user pushes the present location key 16 at the step S124, the display screen is displayed as shown in FIG. 10-(i a) and a place name is requested, at which time the key board 12 is used to introduce the place name. Such process is shown in the step S125 in FIG. 9.

After the place name is introduced, the input key 21 is pushed and then the screen is displayed as shown in FIG. 10-(b), at which time the input key 21 is pushed, whereby the input of the place name can set the coordinates of spot information as those of the present location. Such process is shown in the step S126 in FIG. 9, the process being finished by the step S127.

Figure 11:
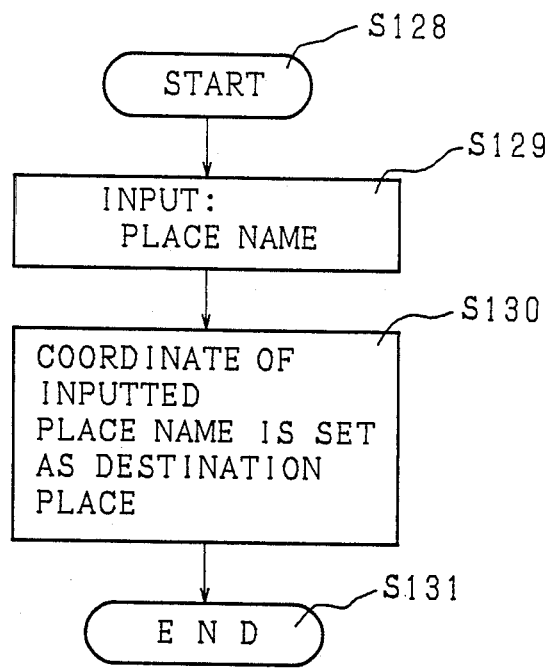
FIG. 11 is a flowchart showing the procedure for registering the present location.

The registered spot as the destination can be set similarly to the above. In this case, the flowchart is shown in FIG. 11, in which the destination key 15 is pushed at the step S128 and the place name of destination requested on the screen is introduced with the key board 12 (step S129) so that the place name of destination is set in the spot coordinates (step S131).

Figures 12, 13:
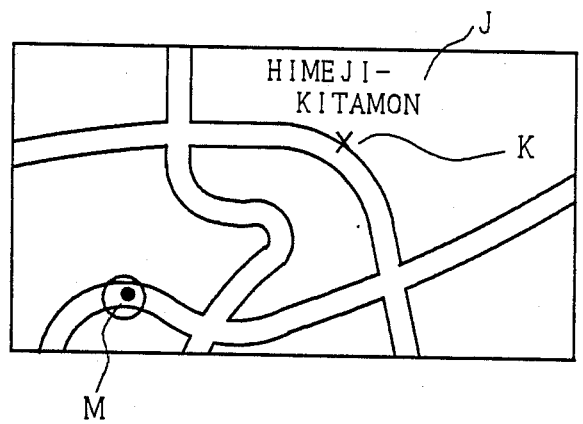
FIG. 12 is an exemplary view of the screen.
FIGS. 13 to 15 and 17 to 19 are flowcharts showing procedures for correcting accumulated errors.

In addition, FIG. 12 shows a display example of the display unit 4 when the vehicle 7 passes through the vicinity of the spot previously stored in the spot memory 11. In the drawing, reference M designates a marker indicating the present location of the vehicle 7, J designates the place name stored in the spot memory 11, and K designates a marker showing the spot position. Thus, the mounted navigation apparatus of the present invention displays the spot in a range of distance capable of being displayed on the screen of the display unit 4, among a plurality of arbitrary spots previously introduced.

As above-mentioned, the user previously introduces the positions and place names of arbitrary spots into the navigation apparatus for the vehicle of the invention so that, when the vehicle is positioned on any of the spot, the place name thereof is introduced into the apparatus, thereby enabling the setting of the present location of the vehicle without introducing complicated numeral values each time.

Next, explanation will be given on the procedure for correcting by the user accumulated errors and operation of the navigation apparatus of the invention.

Figure 14:
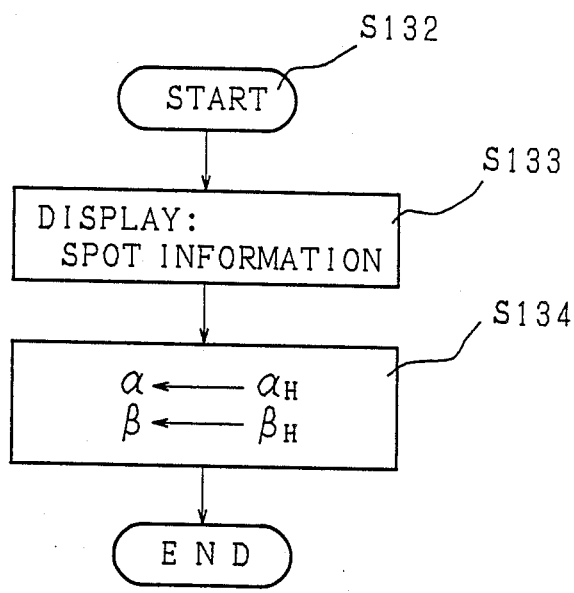

When the user moves the vehicle to the spot, such as his garage, previously registered in the spot memory as the spot to be corrected, he pushes the correction key 18, so that the screen is displayed as shown in FIG. 13 and the coordinates of the present location are set to those of the registered spot, at which time the flowchart of the process is shown in FIG. 14.

In detail, when the correction key 18 is pushed, the process starts at the step S132, the screen is displayed as shown in FIG. 13 at the step S133, and the latitude and longitude ($\alpha$, $\beta$) of the present location P are corrected to those ($\alpha_H$, $\beta_H$) of the previously registered spot to be corrected.

Exploiting the fact that the vehicle often parks at a particular parking place or garage previously registered as the spot to be corrected, the navigation apparatus of the invention uses the positional coordinates of the spot, such as the parking-place or garage, previously registered in the spot memory so that only the correction switch need be pushed to correct the present location and accumulated errors. Hence, the user pushes the correction switch, such as the correction key 18, in one action without complicated operation, thereby enabling the accumulated errors of the present location to be corrected.

Besides, the navigation apparatus of the invention can automatically perform correction without the above-mentioned operation. Such modified embodiment of the invention will be described in accordance with the flowcharts of FIGS. 15, 17 and 18.

Figure 15:
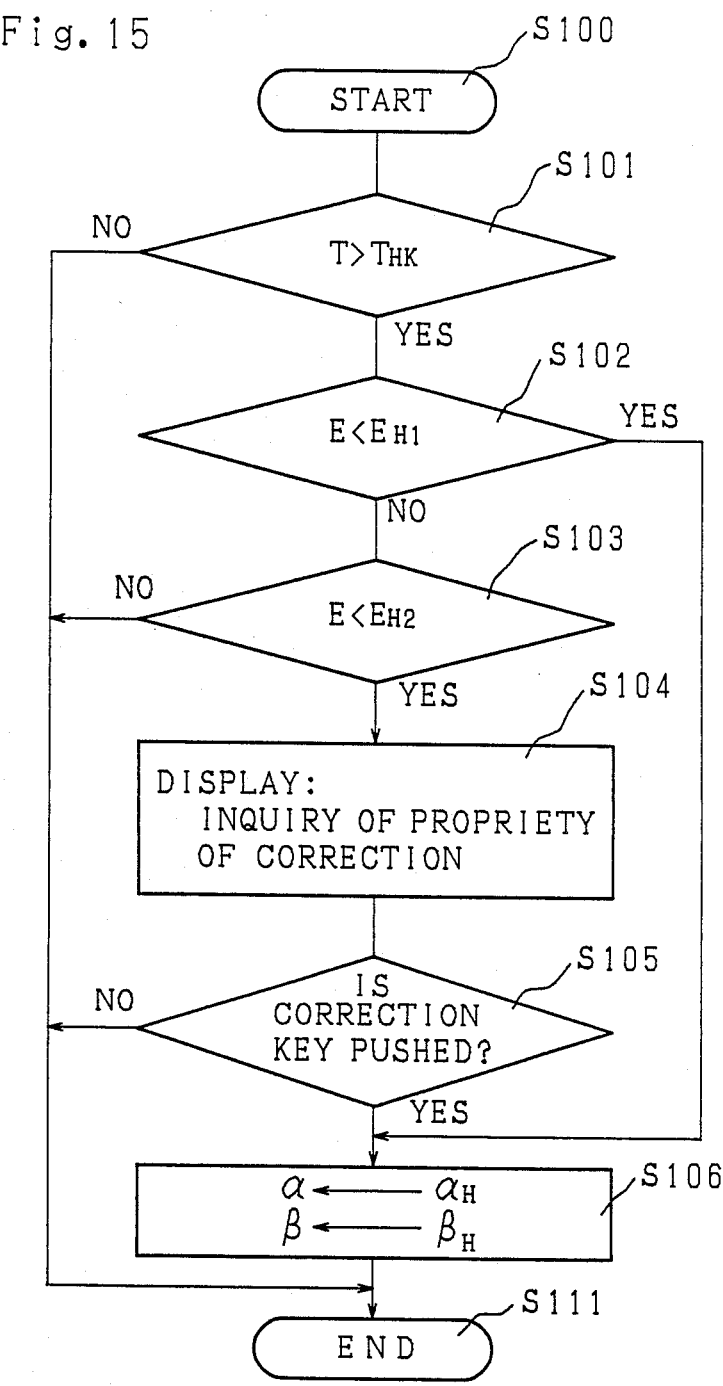

Referring to FIG. 15, the apparatus starts at the step S100. For example, the time duration when an ignition switch is kept off is detected, and at the step S101, it is decided whether or not the same duration T of continuous parking of the vehicle is less than the predetermined time duration $T_{HK}$. If it is, the processing ends at the step S111, whereby the process routine is finished.

If $T > T_{HK}$ at the step S101, the processing is advanced to the step S102, in which a straight-line distance E between the present location P ($\alpha$, $\beta$) and the garage location P ($\alpha_H$, $\beta H$) computed by the control circuit 5 is decided as to whether or not E is smaller than a first reference distance $E_{H1}$.

Unless $E < E_{H1}$ at the step S102, the processing is advanced to the step S103, and if $E < E_{H1}$, to the step S106.

The step S103, as same as the step S102, decides whether or not E is smaller than a second reference distance $E_{H2}$ ($E_{H2} > E_{H1}$). Unless $E < E_{H2}$, the processing is advanced to the step S111 and ends, and of $E < E_{H2}$, it is advanced to the step S104, which inquires of the user by the screen whether or not the correction is to be executed and is advanced to the step S105.

The step S105 decides whether or not the user pushes the correction key 18 to the screen and the processing is advanced in the step S106 when the correction key 18 is pushed.

The step S106 corrects the present location P ($\alpha$, $\beta$) by being replaced with the previously registered position $P_H$ ($\alpha_H$, $\beta_H$) of the garage. After the correction ends, the processing routine is finished at the step S111.

For example, when the ignition switch of the vehicle is turned from off to on, the control circuit 5 starts automatic correction processing at the step S100 and the step S101 decides whether the vehicle has stopped for a long enough time duration, and when it has stopped for too short a time, the processing is advanced to the end step S111, but when not so, to the step S102.

The step S102 decides whether or not the distance E between the present location P ($\alpha$, $\beta$) and the garage is small enough in comparison with the first predetermined distance value $E_{H1}$. When smaller, in other words, when P and $P_H$ are extremely close to each other, the step S106 is executed to correct the present location to the garage position by $\alpha \leftarrow \alpha_H$ and $\beta \leftarrow \beta_H$.

When E is not smaller than $E_{H1}$, the processing is advanced to the step S103 and E is compared with the second reference value $E_{H2}$ larger than $E_{H1}$. When E is not small enough in comparison with $E_{H1}$, the aforesaid correction is not executed and the processing is advanced to the end step S111, but when not so, the step S104 inquires of the user as to whether or not the correction is proper and acts in accordance with the user's response.

The step S105 decides the judgment of the user so that when the correction is instructed, the step S106 executes the correction, and when not so, the processing is transferred to the end step S111, skipping over step S106.

Now, the constants of, for example, 1 km and 2 km may be considered as $EH_{H1}$ and $E_{H2}$, but $E_{H1}$ and $E_{H2}$ may be set as the functions, further concretely as the error of the total traveling distance L, which are given in the following expressions:

$E_{H1} = K_1 X L$
$E_{H2} = K_2 X L$, where $K_1$ and $K_2$ are coefficients.

Besides, FIGS. 16-(a) and -(b) show examples of inquiry display to the user shown in the step S105.

Figure 17:
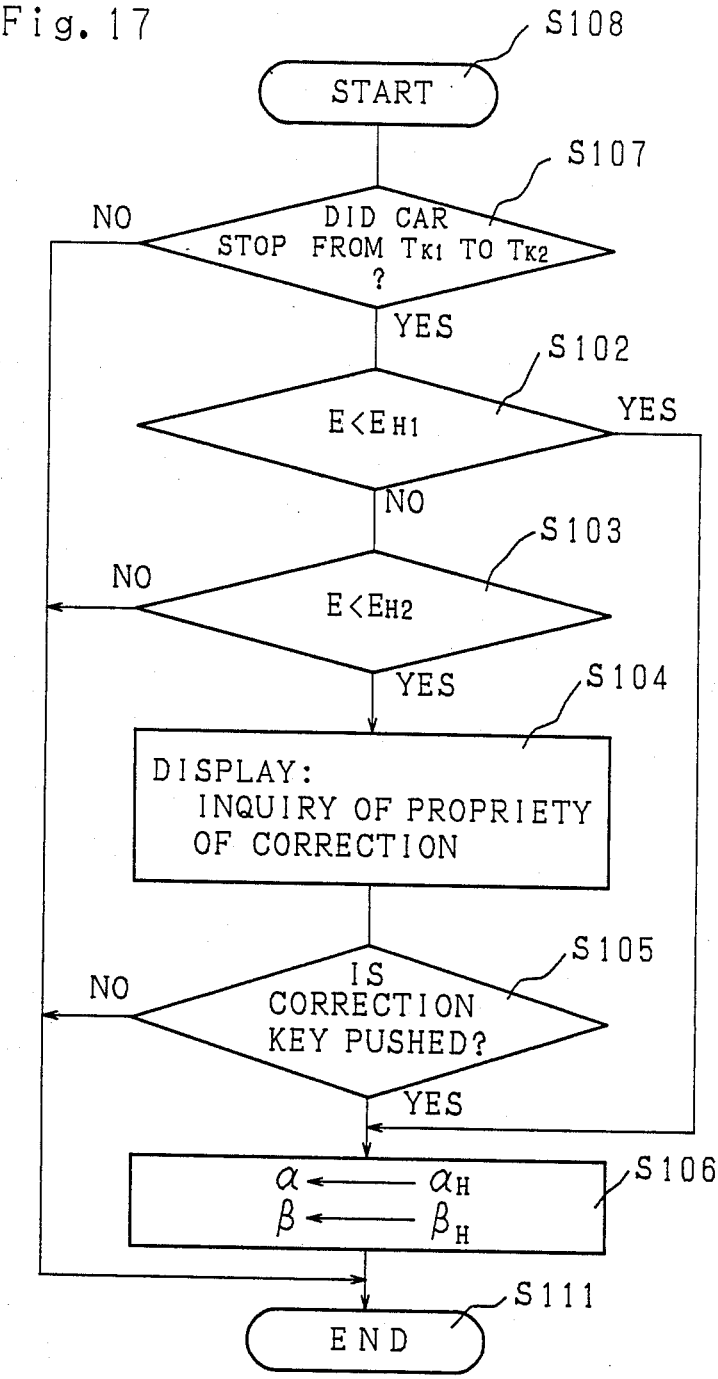

FIG. 17 shows the processing under the condition of time zone of continuous parking of the vehicle as the standard of decision for correction instead of the time T of continuous parking of the same.

For example, when $T_{K1}$ is assumed to be 1 A.M. and $T_{K2}$ to be 4 A.M., the step S107 is to decide whether or not the vehicle is kept stopped from between 1 A.M. to 4 A.M.

Referring to FIG. 17, the processing at step S101 in FIG. 15 is replaced by the step S107.

Figure 18:
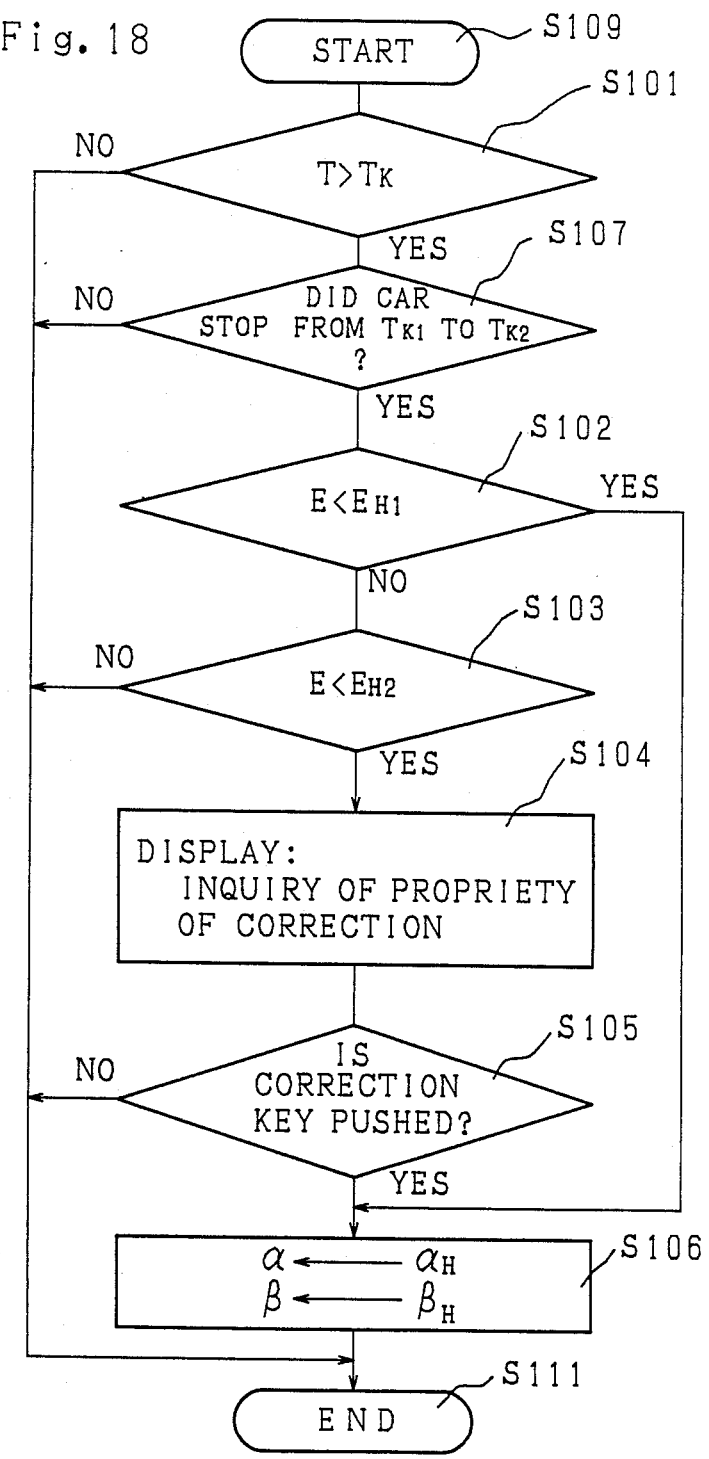
Figure 19:
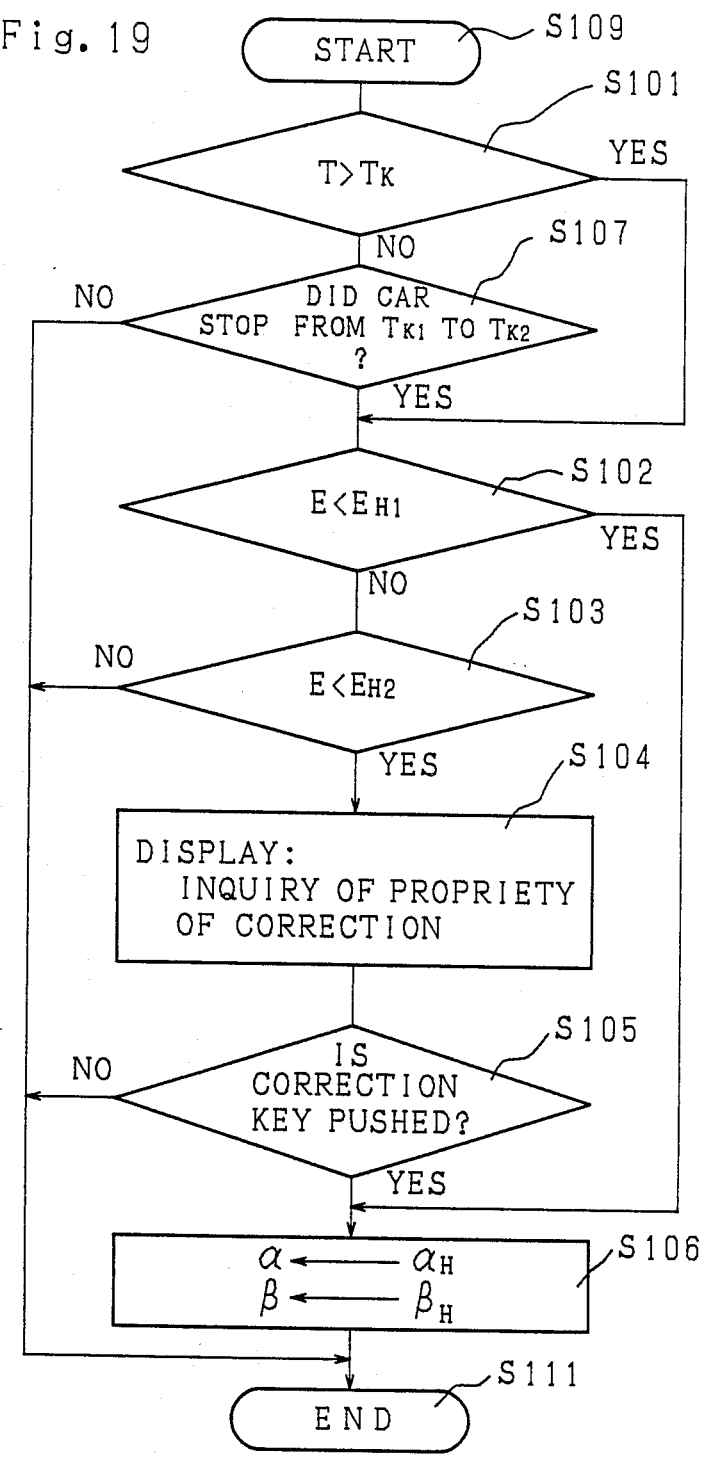

FIGS. 18 and 19 show the flowcharts in combination of the step S101 in FIG. 15 with the step S107 in FIG. 17. In FIG. 18, when $T > T_K$ in the processing at the step S101, after the processing at the step S107, the processing routine as same as that in FIG. 15 is executed. In other words, when the vehicle stops for more than the predetermined duration and moreover over a period of time including the interval $T_{K1} - T_{K2}$, automatic correction is executed.

Referring to FIG. 19, if $T>T_K$ at the step S101, the processing routine as same as that in FIG. 15 is executed, and unless $T>T_K$ at the same, the processing is transferred to the step S102 after the processing at the step S107, and thereafter the processing routine as same as that in FIG. 15 is executed. In other words, when the vehicle stops for over the predetermined duration or during the predetermined interval, the automatic correction is executed.

In addition, in the flowcharts of FIGS. 11 to 19, the start steps are designated by the steps S108, S109 and S110 respectively.

In the above embodiment, means for requesting whether correction is proper or not is provided. Besides this, the correction is executed when the distance E is smaller than that $E_{H1}$ and not executed when E is larger than $E_{H1}$, thereby simplifying operation of the apparatus.

As seen from the above, the navigation apparatus of the invention exploits the fact that the vehicle often parks at a particular garage or parking place and recognizes that it returns to the specified parking place, thereby automatically resetting and correcting the present location. Hence, the user is freed from troublesome operation. Besides, when the decision is difficult, the user is asked whether or not correction is carried out and the correction switch is used to correct errors with one push of a button, such as the key, thereby enabling applicability of error correction to be energized.

Furthermore, when the user desires correction, the correction switch can at any time perform correction, thereby improving reliabilty as well as convenience.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalents of such metes and bounds thereof are therefore intended to be embraced by the claims.

What is claimed is:

1. A navigation apparatus for a vehicle being provided with a travelling distance detection means, an azimuth detection means for detecting a traveling direction of said vehicle, a map memory for storing therein map information relating to a traveling route of said vehicle, a display unit and display control means therefor which reads out the map information from said map memory and graphically displays said map information on said display unit, and a present location computation means which computes present location information of said vehicle on a basis of detection results of said travelling distance detection means and the azimuth detection means and displays said present location information on an image of said display unit, comprising;
    an input means for introducing therein a place name and coordinates of longitude and latitude of an arbitrary spot as spot information thereof;
    a spot memory for storing therein said spot information;
    a stoppage duration detection means for detecting a continuous stoppage duration of said vehicle;
    a closest spot search means for searching said spot memory for a spot closest to the present location computed by said present location computation means;
    a distance computation means which reads out from said spot memory said coordinates of longitude and latitude found by said closest spot search means so as to compute a distance between said coordinates and said present location computed by said present location computation means; and
    a present location correction means which reads out from said spot memory the coordinates of longitude and latitude of the place found by said closest spot search means and replaces the present location information with said coordinates, when the distance computed by said distance computation means is smaller than a predetermined value and the stoppage duration detected by said stoppage duration detection means is greater than a predetermined duration.

2. A navigation apparatus for a vehicle being provided with a travelling distance detection means, an azimuth detection means for detecting a traveling direction of said vehicle, a map memory for storing therein map information relating to a traveling route of said vehicle, a display unit and display control means therefor which reads out the map information from said map memory and graphically displays said map information on said display unit, and a present location computation means which computes present location information of said vehicle on a basis of detection results of said travelling distance detection means and the azimuth detection means and displays said present location information on an image of said display unit, comprising:
    an input means for introducing therein a place name and coordinates of longitude and latitude of an arbitrary spot as spot information thereof;
    a spot memory for storing therein said spot information;
    a stoppage duration detection means for detecting a continous stoppage duration of said vehicle;
    a closest spot search means for searching said spot memory for a spot closest to the present location computed by said present location computation means;
    a distance computation means which reads out from said spot memory said coordinates of longitude and latitude found by said closest spot search means so as to compute a distance between said coordinates and said present location computed by said present location computation means; and
    a present location correction means which reads out from said spot memory the coordinates of longitude and latitude of the place found by said closest spot search means and replaces the present location in formation with said coordinates, when the distance computed by said distance computation means is smaller than a predetermined value and said stoppage duration detection means detects a stoppage duration which overlaps an interval having a predetermined start time and a predetermined end time.

3. A navigation apparatus for a vehicle being provided with a travelling distance detection means, an azimuth detection means for detecting a traveling direction of said vehicle, a map memory for storing therein map information relating to a traveling route of said vehicle, a display unit and display control means therefor which reads out the map information from said map memory and graphically displays said map information on said display unit, and a present location computation means which computes present location information of said vehicle on a basis of detection results of said traveling distance detection means and the azimuth detection means and displays said present location information on an image of said display unit, comprising:

an input means for introducing therein place name and coordinates of longitude and latitude of an arbitrary spot as spot information thereof;

a spot memory for storing therein said spot information;

a stoppage duration detection means for detecting a continuous stoppage duration of said vehicle;

a closest spot search means for searching said spot memory for a spot closest to the present location computed by said present location computation means;

a distance computation means which reads out from said spot memory said coordinates of longitude and latitude found by said closest spot search means so as to compute the distance between said coordinates and said present location computed by said present location computation means;

an automatic present location correction means which reads out from said spot memory the coordinates of longitude and latitude of the place found by said closest spot search means and replaces the present location information with said coordinates, when said distance computed by said distance computation means is smaller than a first reference value and the stoppage duration detected by said stoppage duration detection means exceeds a predetermined duration;

an inquiry means for inquiring of an operator whether the present location information is to be replaced with said coordinates found by said closest spot search means, when the distance computed by said distance computation means is between said first reference value and a second reference value larger than said first reference value and the stoppage duration detected by said stoppage duration detection means exceeds a predetermined duration; and a manual present location correction means which replaces the present location information with said coordinates in response to an affirmative response by said operator.

4. A navigation apparatus for a vehicle being provided with a travelling distance detection means, an azimuth detection means for detecting a traveling direction of said vehicle, a map memory for storing therein map information relating to a traveling route of said vehicle, a display unit and display control means therefor which reads out the map information from said map memory and graphically displays said map information on said display unit, and a present location computation means which computes present location information of said vehicle on a basis of detection results of said traveling distance detection means and the azimuth detection means and displays said present location information on an image of said display unit, comprising:

an input means for introducing therein place name and coordinates of longitude and latitude of an arbitary spot as spot information thereof;

a spot memory for storing therein said spot information;

a stoppage duration detection means for detecting a continuous stoppage duration of said vehicle;

a closest spot search means for searching said spot memory for a spot closest to the present location computed by said present location computation means;

a distance computation means which reads out from said spot memory said coordinates of longitude and latitude found by said closest spot search means so as to compute a distance between said coordinates and said present location computed by said present location computation means;

an automatic present location correction means which reads out from said spot memory the coordinates of longitude and latitude of the place found by said closest spot search means and replaces the computed present location information with said coordinates, when the distance computed by said distance computation means is smaller than a first reference value and said stoppage duration detection means detects a stoppage duration which overlaps an interval having a predetermined start time and a predetermined end time;

an inquiry means for inquiring of an operator whether the present location information is to be replaced with said coordinates found by said closest spot search means, when the distance computed by said distance computation means is between said first reference value and a second reference value larger than said first reference value and the said stoppage duration detection means detects a stoppage which overlaps said interval; and a manual present location correction means replaces the present location information with said coordinates in response to an affirmative response by said operator.

* * * * *